(12) United States Patent
Yano (10) Patent No.: US 7,891,472 B2
(45) Date of Patent: Feb. 22, 2011

(54) SUSPENSION BEARING

(75) Inventor: Hiroshi Yano, Okazaki (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 1092 days.

(21) Appl. No.: 11/489,573

(22) Filed: Jul. 20, 2006

(65) Prior Publication Data

US 2007/0017762 A1 Jan. 25, 2007

(30) Foreign Application Priority Data

Jul. 21, 2005 (JP) ............................ P2005-211068

(51) Int. Cl.
*F16F 9/00* (2006.01)
(52) U.S. Cl. ...................... 188/321.11; 188/84; 188/85; 280/124.147
(58) Field of Classification Search .................. 188/84, 188/85, 321.11; 280/124.147, 271, 272, 280/89; 267/150; 16/334, 35 D
See application file for complete search history.

(56) References Cited

U.S. PATENT DOCUMENTS

| | | | | |
|---|---|---|---|---|
| 2,057,655 A | * | 10/1936 | Anthony et al. | 280/460.1 |
| 3,718,212 A | * | 2/1973 | Havranek | 192/45 |
| 3,750,593 A | * | 8/1973 | Zetterlund | 104/172.2 |
| 4,387,938 A | * | 6/1983 | Brandenstein et al. | 384/490 |
| 4,751,986 A | * | 6/1988 | Takahashi | 188/85 |
| 4,758,012 A | * | 7/1988 | Ogura et al. | 180/409 |
| 5,875,874 A | * | 3/1999 | Okabe et al. | 188/130 |
| 2005/0008276 A1 | | 1/2005 | Beghini et al. | |

FOREIGN PATENT DOCUMENTS

| | | |
|---|---|---|
| FR | 2 848 624 A1 | 6/2004 |
| JP | 05-79047 | 10/1993 |
| JP | 06-101737 | 4/1994 |

OTHER PUBLICATIONS

European Search Report dated Sep. 21, 2006.

* cited by examiner

*Primary Examiner*—Bradley T King
(74) *Attorney, Agent, or Firm*—McGinn IP Law Group, PLLC (57) ABSTRACT

A protruding portion is formed integrally on an outer ring in such a manner as to protrude from an outer raceway surface toward an inner raceway surface. A sliding portion is formed on an inner ring as a separate element from the inner raceway surface in such a manner as to protrude from the inner raceway surface toward the outer raceway surface. Due to the sliding portion being brought into contact with the protruding portion during a relative rotation of the inner ring and the outer ring, the sliding portion is formed by applying an elastic material such as rubber to the inner raceway surface by heating or bonding.

7 Claims, 6 Drawing Sheets

SUSPENSION BEARING

BACKGROUND OF THE INVENTION

The present invention relates to a suspension bearing, and more particularly to a strut type suspension bearing.

A suspension bearing is interposed between an upper end portion of a strut shaft and a support portion on a vehicle body in a strut type suspension which constitutes one of suspension types for vehicles. In general, in an automotive suspension system, a steering operation requiring less steering effort is demanded when a vehicle is steered to turn (or when a steering wheel is turned), whereas when the vehicle is driven to run straight ahead (when the steering wheel rests at its neutral position), it is required that transverse oscillations of steering road wheels produced by irregularities in a road surface are not transmitted to the steering wheel to thereby prevent the deterioration of running stability.

A conventional strut type suspension bearing has a function to reduce rotational torque (rotational resistance) produced when a steering wheel is turned to steer the vehicle to turn through relative rotation of a pair of rings. However, even when the vehicle is driven to run straight ahead, the rotational resistance remains the same as that resulting when the vehicle is steered to turn, and therefore there is a tendency that the running stability is not maintained. Due to this, according to a conventional technique that has been accepted so far, a rotational torque varying construction (for example, a variable gear ratio mechanism which utilizes a planetary gear set and a motor) is incorporated in a steering mechanism so as to obtain a proper rotational resistance that should result when the vehicle is driven to run straight ahead. However, the construction is complex, causing a problem that the production costs are increased.

SUMMARY OF THE INVENTION

A problem that the invention is to solve is to provide a suspension bearing which can obtain a rotational resistance which does not deteriorate the running stability when the vehicle is driven to run straight ahead in a simple construction at low costs.

In order to solve the above problem, the present invention is characterized by having the following arrangements.

(1) A suspension bearing comprising:

a primary ring defining an annular primary raceway surface;

a secondary ring defining an annular secondary raceway surface, the secondary ring being coaxial with the primary ring;

a plurality of rolling elements supported between the primary and secondary raceway surfaces;

a primary engagement portion formed on the primary ring so as to protrude in a radial direction thereof toward the secondary raceway surface and extend in a circumferential direction of the primary raceway surface over a predetermined angle range; and a secondary engagement portion formed on the secondary ring so as to protrude in the radial direction toward the primary raceway surface and extend in a circumferential direction of the secondary raceway surface over a predetermined angle range, wherein the secondary engagement portion is brought into contact with the primary engagement portion to produce a frictional force for increasing a rotational torque within a specific relative rotation angle of the primary and secondary rings when the secondary ring rotates relative to the primary ring.

(2) The suspension bearing according to (1), wherein the primary ring is fixed to an upper portion of a strut shaft and the second ring is fixed to a support portion on a vehicle body.

(3) The suspension bearing according to (2), wherein the relative rotation angle range where the primary and secondary engagement portions are brought into contact with each other is determined based on a neutral position of a road wheel linked to the strut shaft, and the rotational torque is produced due to a contact between the primary and secondary engagement portions when a vehicle is driven to run straight ahead, and when the vehicle is steered to turn, the contact between the primary and secondary engagement portions is cancelled so as to cause the rotational torque to disappear or decline.

(4) The suspension bearing according to (1), wherein a plurality of the primary engagement portions are formed on the primary ring, and a plurality of the secondary engagement portions are formed on the secondary ring corresponding to the plurality of primary engagement portions, and the plurality of primary engagement portions are simultaneously brought into contact with the plurality of corresponding secondary engagement portions within the relative rotation angle range.

(5) The suspension bearing according to (1), wherein one of the primary and secondary engagement portions is formed of a more elastic material than a material for the other.

(6) The suspension bearing according to (5), wherein the primary engagement portion is formed of an elastic material separately from the primary raceway surface, and the secondary engagement portion is formed integrally with the secondary raceway surface.

(7) The suspension bearing according to (6), wherein the primary ring is an inner ring and the secondary ring is an outer ring.

According to the present invention, since a frictional force is produced when the primary and secondary engagement portions are brought into contact (for example, sliding contact) with each other within the specific relative rotation angle range so as to increase the rotational torque of both the rings, even in the event that the steering road wheels are subjected to lateral oscillations which are produced by irregularities in a road surface while the vehicle is driven to run straight ahead thereon, the oscillations so produced are made difficult to be transmitted to the steering wheel, thereby making it possible to prevent the deterioration of the running stability. Moreover, since the incorporation of the rotational torque varying construction in the steering mechanism, which was conventionally carried out, becomes unnecessary and instead, the primary and secondary engagement portions only have to be formed on the primary and secondary rings, respectively, the rotational resistance which prevents the deterioration of running stability while the vehicle is driven to run straight ahead can be obtained in the simple construction at low costs.

Note that a radial bearing such as a radial ball bearing and a thrust bearing such as a thrust ball bearing and a pressed general ball type thrust ball bearing can be used as the suspension bearing of the invention.

According to the present invention, the relative rotation angle range where the rotational torque of both the rings is increased can easily be related to the oscillation angle of the road wheel which is based on the neutral position thereof which results when the vehicle is driven to run straight ahead, so as to realize a more stable running when the vehicle is driven to run straight ahead.

According to the present invention, the contact between the primary and secondary engagement portions is not concentrated on a single point (a minute range) in a circumferential direction thereof, so that the rotational torque can be borne by the plurality of pairs of engagement portions, and therefore, a reduction in performance such as wear due to sliding contact can be suppressed so as to extend the life of the suspension bearing.

In the case that both the rings (raceway surfaces) are made of a metal or polymer material, an elastic material such as a rubber, elastomer and the like can be used for one of the engagement portions, for example.

DETAILED DESCRIPTION OF PREFERRED EMBODIMENTS

Embodiment 1

Figure 1:
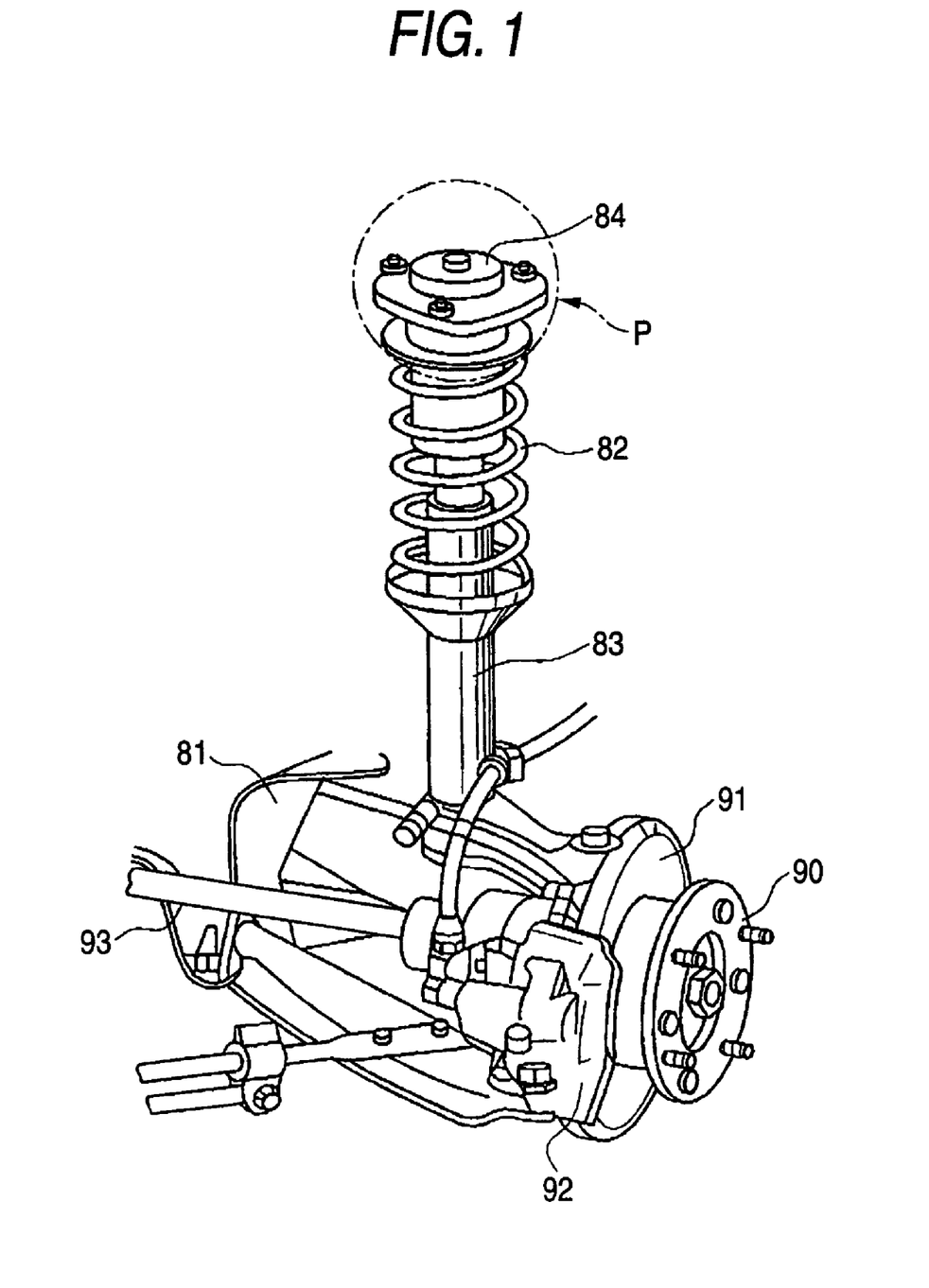
FIG. 1 is a perspective view showing an example of a strut type suspension.
Figure 2:
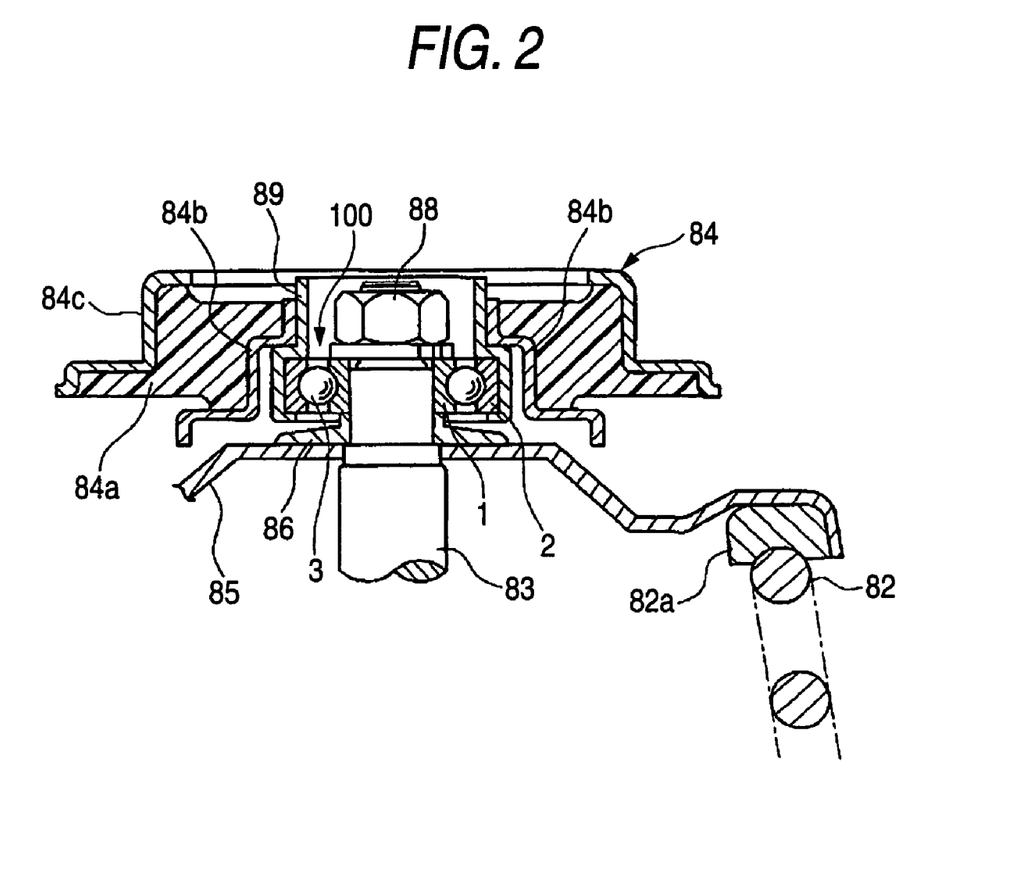
FIG. 2 is an enlarged sectional view of a portion indicated by reference character P in FIG. 1.

Next, a mode for carrying out the invention will be described by reference to an embodiment illustrated in the drawings. FIG. 1 is a perspective view showing an example of a strut type suspension, and FIG. 2 is an enlarged sectional view of a portion indicated by reference character P in FIG. 1. As shown in FIG. 1, the strut type suspension includes a strut shaft 83 (a suspension portion) which is mounted on a support member 81 to support part of a vehicle body, a coil spring 82 which is incorporated in the strut shaft 83 to absorb vibrations and shocks from a tire side and a stabilizer support 84 (a vehicle body side support portion) which is fixed to an upper part of the vehicle body. This strut type suspension is mounted on the support member 81 residing on the vehicle body side at a lower end thereof so as to serve to support the whole vehicle body in a floating fashion relative to an axle or the like. In addition, an axle 93, a hub 90 which is fixed to the axle 93 and on which a road wheel is mounted, a brake disk 91 which is fixed to the hub 90 and a caliper body which incorporates therein a pad which is hydraulically brought into press contact with the brake disk 91 are disposed on the periphery of the support member 81.

As shown in FIG. 2, an upper internal construction of the strut type suspension is made up of a coil spring seat 85 which holds a spring seat 82a of the coil spring 82, a radial ball bearing 100 (a suspension bearing; hereinafter, referred simply to as a bearing) which is fitted on an upper end portion of the strut shaft 83 via a spacer 86, a bearing housing 89 (a vehicle body side support portion) which holds the bearing 100, a nut 88 which is placed on the bearing 100 to fix the bearing 100 in place, and the stabilizer support 84 which holds the bearing 100 and the bearing housing 89 in a surrounding fashion. Note that the stabilizer support 84 is made up of an elastic material 84a, an inner tube portion 84b which covers the elastic material 84a along an inner circumference thereof and an outer tube portion 84c which covers the elastic material 84a along an outer circumference thereof.

In addition, an annular inner ring 1 (a primary ring) of the bearing 100 is fixedly fitted on the strut shaft 83 in such a manner that the inner ring 1 is made to be fixed on to the strut shaft 83 with the nut 88 from above the bearing 100. On the other hand, an annular outer ring 2 (a secondary ring) is fixed to the bearing housing 89.

Figure 3:
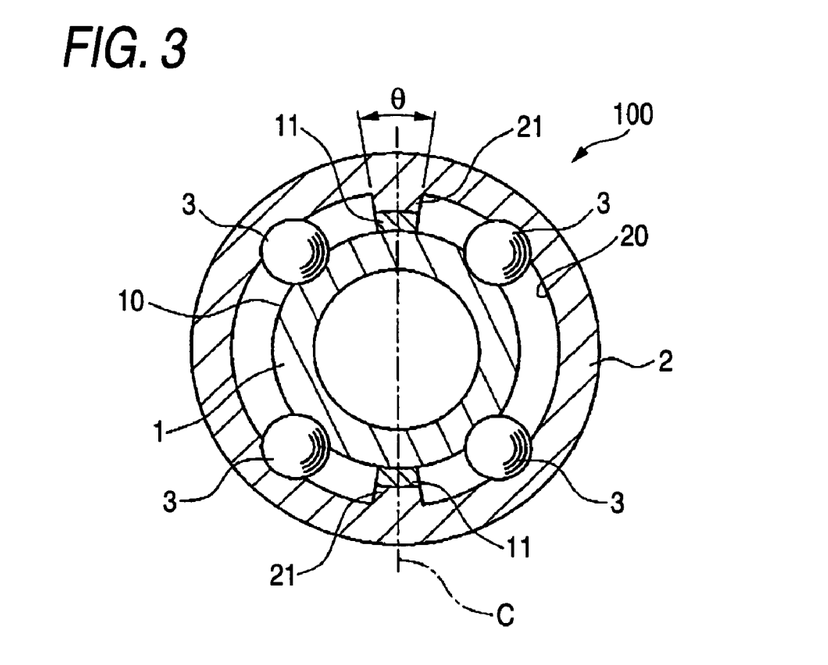
FIG. 3 is a sectional plan view showing an example of a suspension bearing according to the invention.

Next, FIG. 3 is a sectional plan view illustrating an example of a suspension bearing according to the invention. A bearing 100 shown in FIG. 3 has an inner ring 1 (a primary ring) made of metal which supports a plurality of balls 3 (rolling elements) and forms an annular inner raceway surface 10 (a primary raceway surface) and an outer ring 2 (a secondary ring) made of metal which form an annular outer raceway surface 20 which faces the inner raceway surface 10 in such a manner as to hold the rolling elements between the inner raceway surface 10 and itself. As has been described above, the inner ring 1 is fixed to the upper end portion of the strut shaft 83, while the outer ring 2 is fixed to the stabilizer support 84 (the bearing housing 89) which constitutes the vehicle body side support portion (refer to FIG. 2.).

A protruding portion 21 (a secondary engagement portion) is formed integrally on the outer ring 2 in such a manner as to protrude from the outer raceway surface 20 toward the inner raceway surface 10. On the other hand, a sliding portion 11 (a primary engagement portion) is formed on the inner ring 1 as a separate element from the inner raceway surface 10 in such a manner as to protrude from the inner raceway surface 10 toward the outer raceway surface 20. This sliding portion 11 is formed by applying a material such as rubber having elasticity to the inner raceway surface 10 by heating or bonding due to a distal end face of the sliding portion 11 being brought into contact with a distal end face of the protruding portion 21 during a relative rotation between the inner ring 1 and the outer ring 2.

The sliding portion 11 of the inner ring 1 is formed at more than one locations (here, two locations) on the inner race 1 in such a manner as to extend over an angle range θ (for example, 10°) at each location as well as divide the inner raceway surface 10 circumferentially equally. In addition, the protruding portion 21 of the outer ring 2 is also formed at more than one locations (here, two locations) on the outer race 2 in such a manner as to extend over the angle range θ (for example, 10°) at each location as well as divide the outer raceway surface 20 circumferentially equally.

Here, a relative rotation angle range where the sliding portion 11 and the protruding portion 21 are brought into contact with each other is determined based on a neutral position C of a road wheel (not shown) linked to the strut shaft 83 (refer to FIG. 2.) to be the angle range θ (for example, +/−5° from the neutral position C as a center). Then, the two pairs of sliding portions 11 and protruding portions 21 are to start contacting (sliding on) each other substantially simultaneously and stop contacting (sliding on) each other substantially simultaneously.

Figure 4:
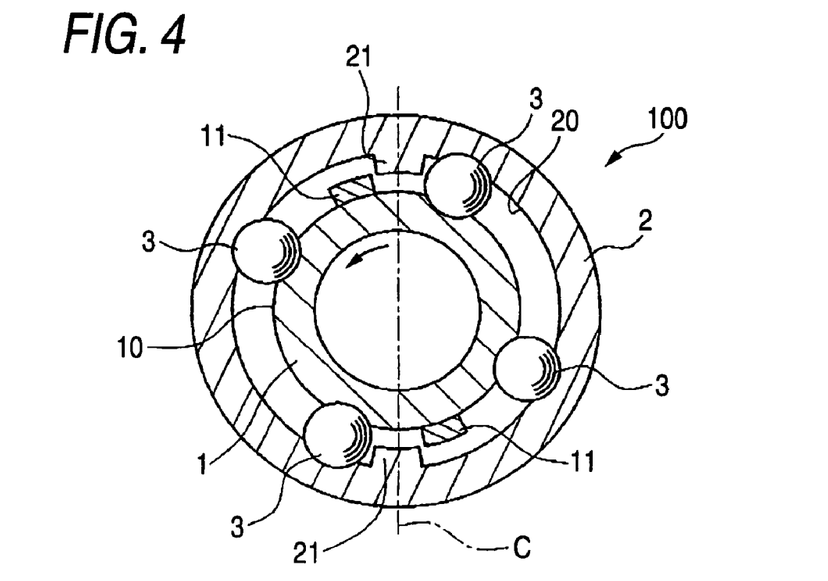
FIG. 4 is a sectional plan view showing an operating state where a steering wheel is manipulated from the state shown in FIG. 3.

Consequently, in such a case as shown in FIG. 3 where the vehicle is driven to run straight ahead, when the sliding portions 11 and the protruding portions 21 are brought into contact with each other, a frictional force is produced, whereby the rotational torque of both the rings 1, 2 is increased, and the inner ring 1 and the outer ring 2 are made difficult to rotate relatively, the running stability being thus maintained. On the other hand, in such a case as shown in FIG. 4 where the vehicle is steered to turn, the contact between the sliding portions 11 and the protruding portions 21 is cancelled by manipulating the steering wheel, and therefore, the rotational torque of both the rings 1, 2 is caused to disappear (decline), the steering wheel manipulating effort is reduced.

Moreover, since the sliding portions 11 and the protruding portions 21 only have to be formed on the inner and outer rings 1, 2, respectively, the desired bearing can be configured in the simple construction at lower costs.

Embodiment 2

Figure 5:
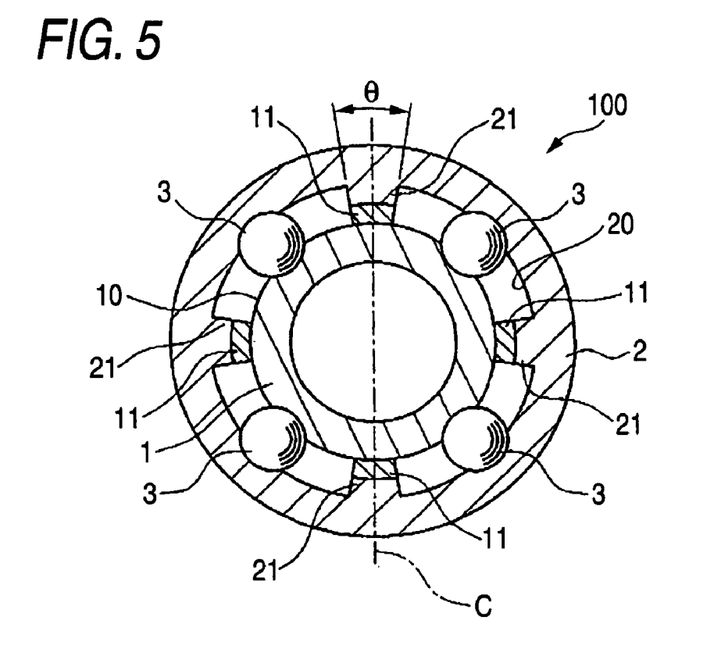
FIG. 5 is a sectional plan view showing another example of a suspension bearing according to the invention.

FIG. 5 shows a bearing 100 according to another embodiment of the invention. In the bearing 100 shown in FIG. 5, a sliding portion on an inner ring 1 and a protruding portion 21 on an outer ring 2 are formed at four locations, respectively. In the event that the plurality of pairs of sliding portions 11 and protruding portions 21 are formed like this, a circumferential angle interval is set to be larger than a maximum oscillation angle of the road wheel so as to realize a form in which their mating protruding portions and their mating sliding portions are determined for the sliding portions 11 and the protruding portions, respectively. In addition, the contact between the sliding portions 11 and the protruding portions 21 is not concentrated on a single point (a minute range) in the circumferential direction but the rotational torque can be equally borne by the plurality of pairs of engagement portions, thereby making it possible to prevent the reduction in performance such as of wear due to sliding contact.

Embodiment 3

Figure 6:
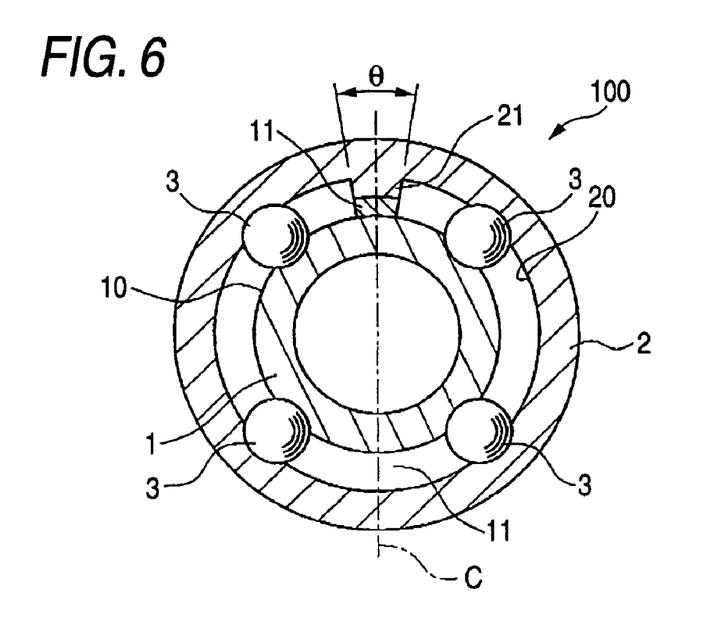
FIG. 6 is a sectional plan view showing a further example of a suspension bearing according to the invention.

FIG. 6 shows a bearing according to a further embodiment of the invention. In the bearing 100 shown in FIG. 6, a sliding portion on an inner ring 1 and a protruding portion 21 on an outer ring 2 are formed only at a single location, respectively. By limiting the formation of the sliding portion 11 and the protruding portion 21 to the single location, respectively, the construction of the bearing can be simplified further.

MODIFIED EXAMPLES

Figure 7:
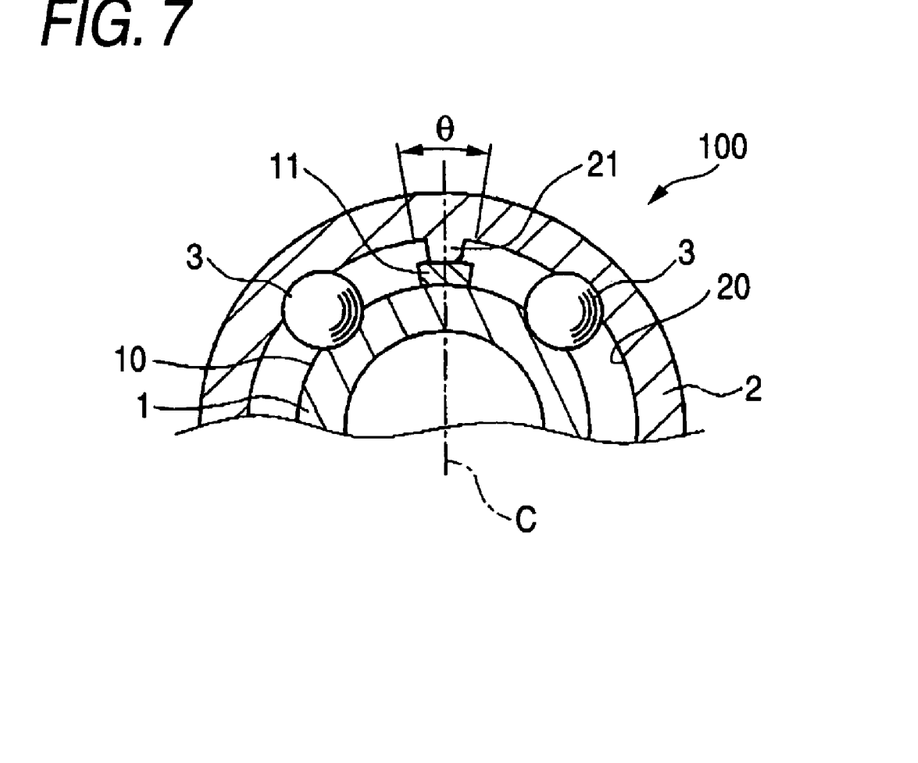
FIG. 7 is a sectional plan view showing an modified example of an engagement portion.
Figure 8:
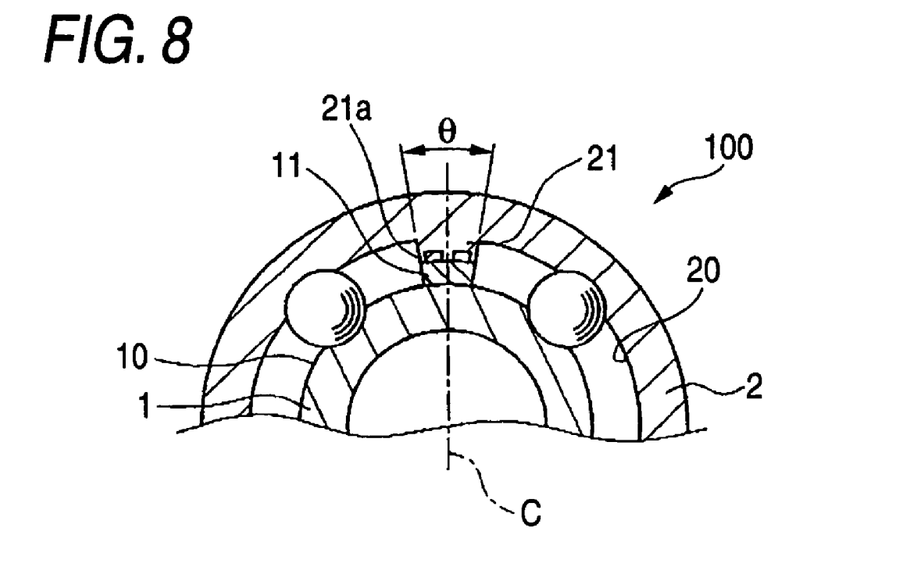
FIG. 8 is a sectional plan view showing another modified example of an engagement portion.

Furthermore, sliding portions 11 and protruding portions 12 according to modified examples of the invention are shown in FIGS. 7 to 10. In FIG. 7, an angle range for a sliding portion 11 is made smaller than an angle range θ (a relative rotation angle range) for a protruding portion 21. In addition, in FIG. 8, recess portions 21a are formed in a distal surface portion of a protruding portion 21. The contact area between the protruding portion 21 and a sliding portion 11 is reduced by the recess portions 21 so formed, thereby making it possible to adjust the rotational torque that should result when the vehicle is steered to turn and is driven to run straight ahead.

Figure 9:
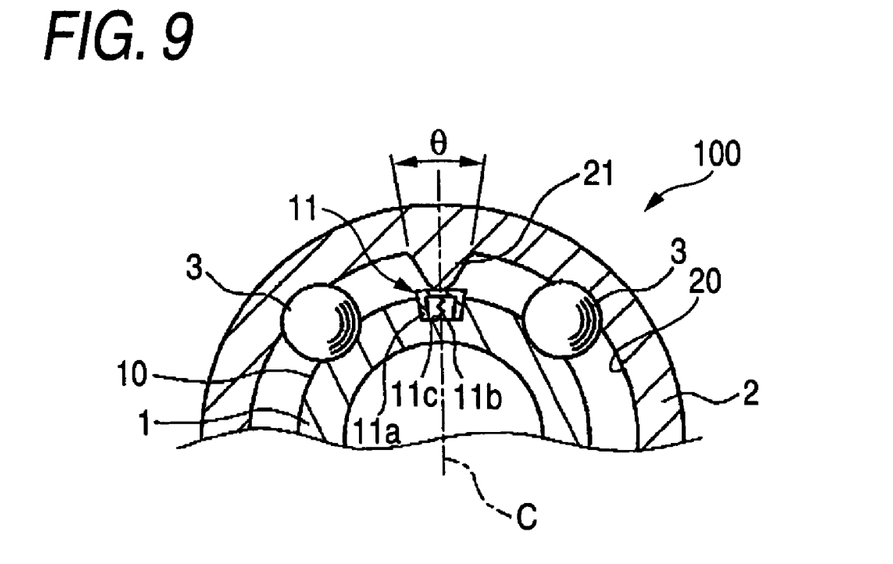
FIG. 9 is a sectional plan view showing a further modified example of an engagement portion.
Figure 10:
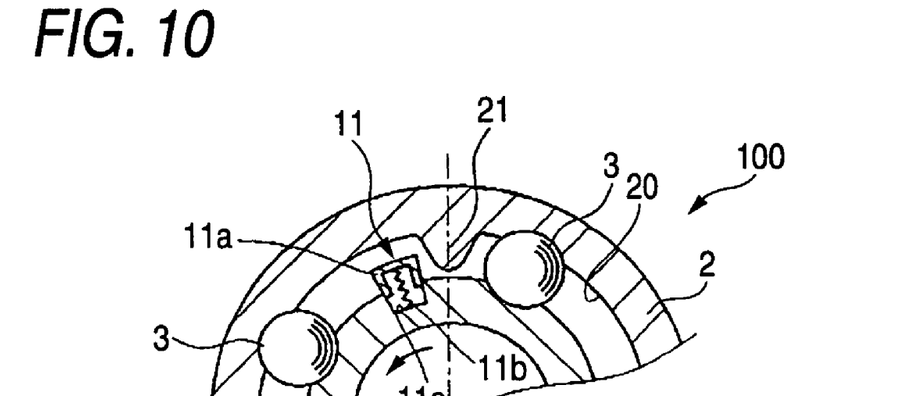
FIG. 10 is a sectional plan view showing an operating state where the steering wheel is manipulated from the state shown in FIG. 9.

In FIGS. 9 and 10, a protruding portion 21 is formed into a cam-like shape, and a protruding portion 11 has a sliding element 11a which can protrude from and retract into a recess portion 11c formed in an inner raceway surface 10. In addition, the sliding element 11a is biased in a direction in which the sliding element 11a protrudes from the recess portion 11c by means of a spring 11b. As shown in FIG. 9, the cam-shaped protruding portion 21 presses against a distal end face of the sliding element 11a against the biasing force of the spring 11b while the protruding portion 21 is situated at a neutral position C and within a relative rotation angle range θ (while the vehicle is driven to run straight ahead), whereby a rotational resistance is produced based on a frictional force between the protruding portion 21 and the sliding element 11a. As shown in FIG. 10, when the protruding portion 21 comes out of the relative rotation angle range θ (when the vehicle is steered to turn), the contact between the protruding portion 21 and the sliding element 11a is cancelled, the rotational torque of both the rings 1, 2 is caused to disappear (decline).

While in the embodiments that have been described heretofore, only the radial ball bearing is described as being used as the suspension bearing, needless to say, a thrust bearing such as a thrust ball bearing and a pressed general ball type thrust ball bearing may, of course, be used instead. In addition, the sliding portion 11 and the protruding portion 21 may be provided on either of the inner ring 1 and the outer ring 2.

What is claimed is:

1. A suspension bearing comprising:
   a primary ring defining an annular primary raceway surface;
   a secondary ring defining an annular secondary raceway surface, the secondary ring being coaxial with the primary ring;
   a plurality of rolling elements supported between the primary and secondary raceway surfaces;
   a primary engagement portion formed on the primary ring so as to protrude in a radial direction thereof toward the secondary raceway surface and extend in a circumferential direction of the primary raceway surface over a predetermined angle range; and
   a secondary engagement portion formed on the secondary ring so as to protrude in the radial direction toward the primary raceway surface and extend in a circumferential direction of the secondary raceway surface over a predetermined angle range, the secondary engagement portion being formed integrally with the secondary raceway surface,
   wherein the secondary engagement portion is brought into contact with the primary engagement portion to produce a frictional force for increasing a rotational torque within a specific relative rotation angle of the primary and secondary rings when the secondary ring rotates relative to the primary ring, and
   wherein the secondary engagement portion is brought out of contact with the primary engagement portion within another specific relative rotation angle of the primary and secondary rings when the secondary ring rotates relative to the primary ring.

2. The suspension bearing according to claim 1, wherein the primary ring is fixed to an upper portion of a strut shaft and the second ring is fixed to a support portion on a vehicle body.

3. The suspension bearing according to claim 1, wherein the primary engagement portion comprises a plurality of primary engagement portions formed on the primary ring, and the secondary engagement portion comprises a plurality of the secondary engagement portions formed on the secondary ring corresponding to the plurality of primary engagement portions, and wherein the plurality of primary engagement portions are simultaneously brought into contact with the plurality of corresponding secondary engagement portions within the relative rotation angle range.

4. The suspension bearing according to claim 1, wherein one of the primary and secondary engagement portions is formed of a more elastic material than a material for the other.

5. The suspension bearing according to claim 4, wherein the primary engagement portion is formed of an elastic material separately from the primary raceway surface, and the secondary engagement portion is formed integrally with the secondary raceway surface.

6. The suspension bearing according to claim 5, wherein the primary ring comprises an inner ring and the secondary ring comprises an outer ring.

7. A suspension bearing comprising:
a primary ring defining an annular primary raceway surface;
a secondary ring defining an annular secondary raceway surface, the secondary ring being coaxial with the primary ring;
a plurality of rolling elements supported between the primary and secondary raceway surfaces;
a primary engagement portion formed on the primary ring so as to protrude in a radial direction thereof toward the secondary raceway surface and extend in a circumferential direction of the primary raceway surface over a predetermined angle range; and a secondary engagement portion formed on the secondary ring so as to protrude in the radial direction toward the primary raceway surface and extend in a circumferential direction of the secondary raceway surface over a predetermined angle range, wherein the secondary engagement portion is brought into contact with the primary engagement portion to produce a frictional force for increasing a rotational torque within a specific relative rotation angle of the primary and secondary rings when the secondary ring rotates relative to the primary ring, wherein the primary ring is fixed to an upper portion of a strut shaft and the second ring is fixed to a support portion on a vehicle body, wherein the relative rotation angle range where the primary and secondary engagement portions are brought into contact with each other is determined based on a neutral position of a road wheel linked to the strut shaft, and wherein the rotational torque is produced due to a contact between the primary and secondary engagement portions when a vehicle is driven to run straight ahead, and when the vehicle is steered to turn, the contact between the primary and secondary engagement portions is cancelled so as to cause the rotational torque to disappear or decline.

* * * * *